(12) United States Patent
Kennedy et al.

(10) Patent No.: US 6,736,704 B2
(45) Date of Patent: May 18, 2004

(54) LAPPING CARRIER FOR USE IN FABRICATING SLIDERS

(75) Inventors: Leo E. Kennedy, Colorado Springs, CO (US); Oh-Hun Kwon, Westborough, MA (US); Matthew A. Simpson, Sudbury, MA (US); Stanley C. Smith, Colorado Springs, CO (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 10/414,913

(22) Filed: Apr. 16, 2003

(65) Prior Publication Data

US 2003/0199228 A1 Oct. 23, 2003

Related U.S. Application Data (60) Provisional application No. 60/373,450, filed on Apr. 18, 2002.

(51) Int. Cl.[7] .................................................. B24B 1/00
(52) U.S. Cl. ............................ 451/28; 451/11; 451/387
(58) Field of Search ............................. 451/28, 11, 41, 451/460, 389, 390; 29/603.07, 603.12, 603.16, 603.17

(56) References Cited

U.S. PATENT DOCUMENTS

| | | | |
|---|---|---|---|
| 5,023,991 A | 6/1991 | Smith | |
| 5,117,589 A * | 6/1992 | Bischoff et al. | 451/405 |
| 5,463,805 A | 11/1995 | Mowry et al. | |
| 5,738,566 A | 4/1998 | Li et al. | |
| 5,951,371 A * | 9/1999 | Hao | 451/28 |
| 5,991,698 A | 11/1999 | Hao et al. | |
| 6,017,264 A | 1/2000 | Strom | |
| 6,093,083 A | 7/2000 | Lackey | |
| 6,261,165 B1 | 7/2001 | Lackey et al. | |
| 6,274,524 B1 * | 8/2001 | Shinji et al. | 501/103 |
| 6,347,983 B1 | 2/2002 | Hao et al. | |
| 6,360,428 B1 | 3/2002 | Sundaram et al. | |
| RE38,340 E * | 12/2003 | Hao | 451/5 |
| 2001/0051491 A1 | 12/2001 | Hao et al. | |
| 2002/0010069 A1 | 1/2002 | Shinji et al. | |
| 2002/0177518 A1 | 11/2002 | Kwon et al. | |

FOREIGN PATENT DOCUMENTS

| | | |
|---|---|---|
| EP | 1 046 462 A2 | 10/2000 |
| EP | 1 046 462 A3 | 3/2001 |

\* cited by examiner

*Primary Examiner*—Dung V. Nguyen
(74) *Attorney, Agent, or Firm*—Toler, Larson & Abel, LLP (57) ABSTRACT

A lapping carrier for machining a row of magneto-resistive elements is disclosed. The lapping carrier includes a plurality of movable elements, the movable elements terminating at an outer surface to form a generally planar mounting surface for a row of magneto-resistive elements. The lapping carrier is formed of a ceramic material. A method for lapping or machining a row of magneto-resistive elements is also disclosed.

59 Claims, 3 Drawing Sheets

LAPPING CARRIER FOR USE IN FABRICATING SLIDERS

CROSS-REFERENCE TO RELATED APPLICATION(S)

The present application claims priority from U.S. provisional patent application No. 60/373,450, filed Apr. 18, 2002, entitled "Lapping Carrier For Use In Fabricating Sliders," naming inventors Leo E. Kennedy, Oh-Hun Kwon, Matthew A. Simpson, and Stanley C. Smith, which application is incorporated by reference herein in its entirety.

The present application is related to and incorporates by reference the subject matter of patent application Ser. No. 09/988,894, filed Nov. 19, 2001, entitled "ESD Dissipative Ceramics".

BACKGROUND

1. Field of the Invention

The present invention relates generally to lapping carriers, also known as row tools or row bending tools, for lapping rows of magneto-resistive elements. In particular, the present invention relates to a new lapping carrier and method for lapping rows of magneto-resistive elements.

2. Description of the Related Art

Magneto-resistive (MR) elements, typically in the form of read/write heads are produced by techniques similar to those used in semiconductor chip fabrication. Typically, a ceramic wafer is used as a substrate, and a plurality of deposition, lithographic and etching steps are carried out to form a generally repetitive array of MR elements. As wafer processing is completed, typically the wafer is sliced, such that the array of elements is cut into a plurality of longitudinal strips, each containing a plurality of MR elements. The units which house these read/write heads, also known as sliders or flying heads, are then further processed prior to dicing into individual units.

As the density of magnetic storage media has increased by orders of magnitude over the years, the distance from which such heads are offset from the magnetic storage media during read/write operations has been further decreased. As such, it has become necessary to tightly control the surface roughness, contour, as well as the distance from which the MR elements are spaced apart from the storage media. Accordingly, it has become conventional practice to lap or machine the surfaces of the MR elements that become the air bearing surfaces or top surfaces of the sliders, so as to precisely control surface contour, flatness, roughness, and critical spacing parameters. Typically, the surfaces that are created by slicing the MR elements into rows (i.e., the newly formed surfaces that extend perpendicular to the top and bottom surfaces of the wafer), are those surfaces which are precisely controlled by lapping.

U.S. Pat. No. 6,093,083, details a state of the art process and associated tools used in connection with lapping rows of MR elements. As is understood in the art, typically a row is bonded to a row carrier, which in turn is affixed to a row tool. The row carrier is typically a metal or ceramic plate to which the row is bonded. The row/row carrier assembly is then bonded to the row tool. The row tool is configured so as to have a plurality of individually adjustable movable elements (e.g., such as in the form of fingers) that adjust the relative height or depth of individual portions of the row, so as to optimize the degree of lapping during the lapping process to achieve a desired resistance in MR row (strip) and flatness.

U.S. Pat. No. 6,274,524 discloses electrostatic discharge dissipative components used in various applications, including magneto-resistive head manufacture. However, such components have been found to lack performance in practical use.

While state of the art processes and associated tools are believed to be effective, a need continues to exist in the art for improved techniques and tools for carrying out lapping of rows of MR elements.

SUMMARY

According to an embodiment of the present invention, a lapping carrier is provided for machining a row of magneto-resistive (MR) elements. The lapping carrier includes a plurality of movable elements that terminate at an outer surface to form a generally planar mounting surface for the row of MR elements. The lapping carrier is generally formed of a ceramic material having electrostatic discharge (ESD) dissipative properties and high density.

Further, according to another embodiment of the present invention, a method for lapping a row of magneto-resistive (MR) elements is provided, in which a row of MR elements is mounted to the lapping carrier described above, and the row is then machined to remove material therefrom.

Another embodiment of the invention calls for a lapping carrier assembly, including a lapping carrier for machining a row of magneto-resistive elements, the lapping carrier including a plurality of movable elements, the movable elements terminating at an outer surface to form a generally planar mounting surface for a row of magneto-resistive elements. The lapping carrier is generally formed of a ceramic material having electrostatic discharge (ESD) dissipative properties and high density. The lapping carrier assembly further includes an actuator assembly including a plurality of transducers adapted to bias individual movable elements

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
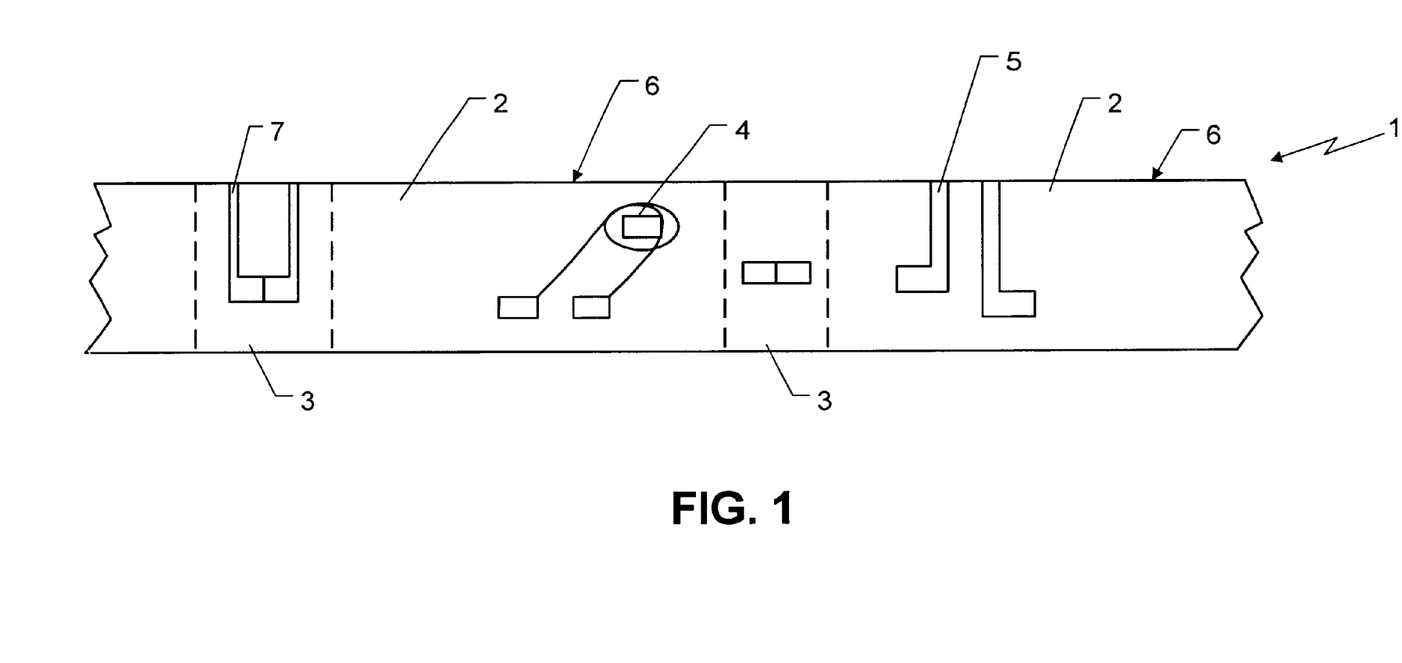
FIG. 1 illustrates a portion of a magneto-resistive (MR) row, sliced from a ceramic wafer.

According to a feature of the present invention, a lapping carrier and method for executing lapping of a row of magneto-resistive (MR) elements are provided. FIG. 1 illustrates an example of a row 1 of MR elements.

As shown, FIG. 1 illustrates a portion of a row 1 of MR elements that have been sliced from a ceramic wafer after wafer fabrication steps have been completed. The row 1 includes several different portions, including MR slider portions 2, which eventually form MR sliders such as disk drive sliders after execution of additional processing steps.

The MR slider portions 2 are offset from each other by kerf regions 3, which regions are removed during a dicing operations before or after lapping. The kerf regions 3 may be free of MR elements, or may contain MR electrical lapping guides 7, as shown. The MR electrical lapping guides may be utilized during the lapping operation prior to dicing, to monitor the lapping progress real-time during processing. Alternatively, the MR electrical lapping guides may be deposited in some otherwise empty area on the MR slider portions, thus enabling their use if dicing is performed before lapping.

Turning to the MR slider portions 2, several different MR elements are illustrated. In this regard, it is noted that the term 'MR element(s)' is used herein in a generic sense to indicate different types of MR elements are commonly found in MR sliders. In particular, the MR elements may include MR sensors 5, as well as read/write MR heads, such as write head 4 as illustrated. For clarity, it is understood that the top surface 6 of the row is that surface which is lapped during later stage processing steps, and which forms the air-bearing surface of individual MR sliders. Additional details of conventional rows of MR elements, such as electrical contact portions, are not shown here in detail, but are well understood by those of ordinary skill in the art.

Figure 2:
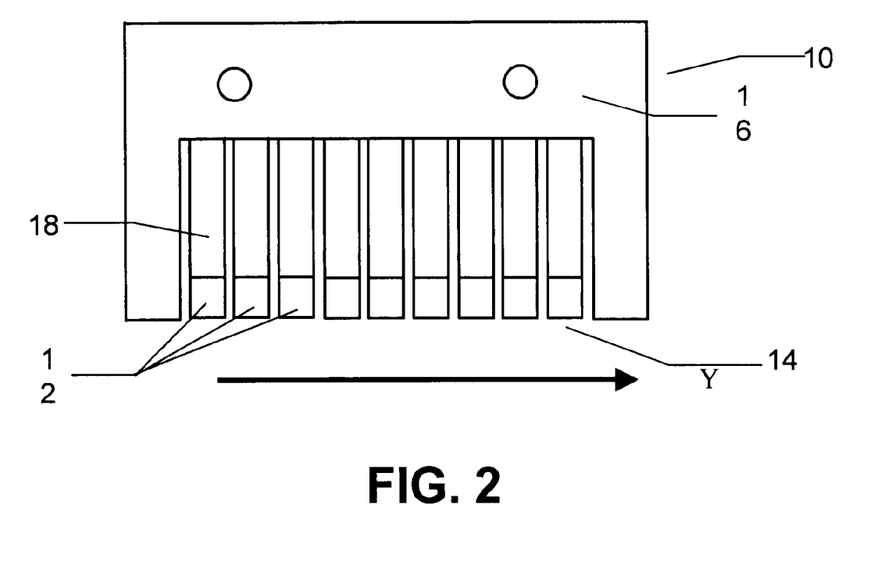
FIG. 2 illustrates a top perspective view of a lapping carrier according to an embodiment of the present invention.

Turning to FIG. 2, a top view of an embodiment of the present lapping carrier is illustrated. The lapping carrier 10 has a generally elongate shape and has an axis Y (for frame of reference), in this case a longitudinal axis. The lapping carrier 10 includes a plurality of movable elements 12 that collectively form a movable portion 14 of the lapping carrier 10. The movable elements 12 are connected to a fixed portion 16 of the lapping carrier 10 via flexure regions 18. As shown, each movable element 12 is connected to the fixed portion 16 of the lapping carrier 10 through its devoted or unique flexure region 18. The movable elements 12 terminate to form a generally planar elongate surface 19, to which the row 1 of MR elements is mounted for lapping. The generally planar elongate surface 19 is a mounting surface, and generally defines an active lapping side of the lapping carrier 10. Each of the movable elements 12 can be moved by a bias force in a direction generally perpendicular to the plane of the mounting surface 19, as described in more detail hereinbelow. According to a feature of the embodiment shown in FIG. 2, the movable elements are independently movable, although other embodiments may have movable elements that are grouped together. The terms 'movable portion' and 'fixed portion' (also, 'stationary portion') are relative, indicating that the respective portions move or translate with respect to each other. Here, the fixed portion is generally fixed in a lapping fixture and is fixed in position, and the movable portion composed of the movable elements is that which is biased.

In the embodiment illustrated in FIG. 2, the movable elements are spaced apart from each other by some multiple of the width of the slider of the row (1.6 mm for a 50% slider) plus an allowance for kerf region width (typically less than 0.5 mm). The foregoing spacing is typically measured on-center (from the centerline of one movable element to the centerline of an adjacent movable element), although different on-center spacing may be specified. The spacing is generally constant through the array of movable elements. Typically the spacing is on the order of about 0.4 mm to about 2 mm. Through-holes extending through the fixed portion 16 are used to affix the lapping carrier in a fixture for lapping operations.

Figure 3:
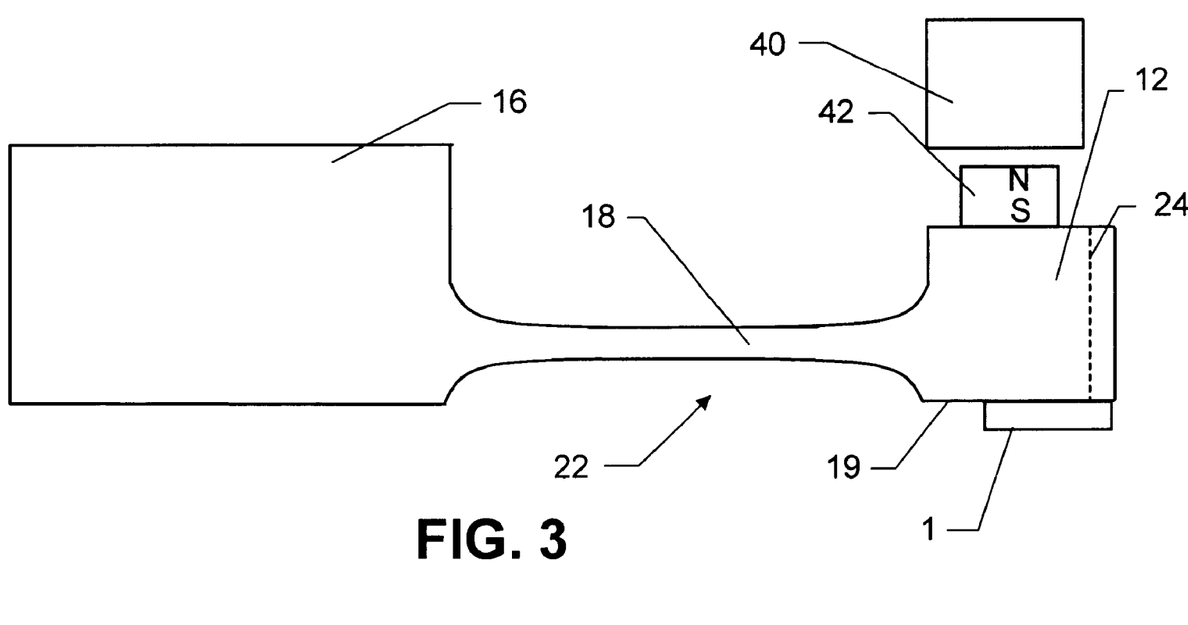
FIG. 3 illustrates a cross sectional view of the lapping carrier illustrated in FIG. 2, taken through one of the movable elements.

Turning to FIG. 3, a cross-sectional view of the lapping carrier 10 is provided. As shown, movable element 12 is connected to the fixed portion 16 of the lapping carrier 10 through a flexure regions 18. A magnetic element 42 is provided to effect movement of the movable elements 12 along a direction 24 (in the orientation shown in FIG. 3, a vertical direction). The flexure region is formed by provision of an elongate notch 22 (and opposing notch) extending along the longitudinal axial direction of the lapping carrier 10 (direction Y in FIG. 2).

The lapping carrier assembly is combined with an actuator assembly or structure. As illustrated, the row 1 of MR elements is mounted to the mounting surface 19 formed by the terminating ends of the movable elements 12. The actuator structure or assembly is composed of magnetic element 42 and an opposing electromagnetic element 40, positioned and configured to precisely move movable element 12 along its axial direction, denoted by the dashed line 24. The electromagnetic element 40 receives an input electrical signal and biases the movable element 12 to move in the axial direction of the movable elements (the vertical direction as shown in FIG. 3) in response to that signal, due to attractive and repulsive forces between the electromagnetic element 40 and the and magnetic element 42. While an electromagnetic element and a magnetic element (e.g., a permanent magnet) are used to effect a biasing force, other types of transducers may also be used, including electromechanical elements such as voice coils or piezoelectric elements, which enable precise movements based on input electrical signals. It is noted that while only a single actuating structure is shown in FIG. 3, generally a devoted actuating structure is provided for each individual movable element 12.

While a particular actuator structure has been described above, it is noted that the actuator structure may be configured in different ways, provided that it effectively biases the movable elements. For example, an actuating rod may be incorporated to mechanically engage the movable elements, which is biased by a transducer as described above thereby biasing the movable elements.

By virtue of the flexure regions that connect individual movable elements 12 to the fixed portion 16 of the lapping carrier 10, the movable elements move in their axial direction in response to a biasing force applied through actuating structure, the biasing or actuating force being generated by virtue of signals sent to the actuating structure, and in particular, to the electromagnetic element 40. Here, the flexure regions are made so as to be flexible and allow slight axial movements of the movable elements 12. In the embodiment shown in FIG. 3, flexibility is provided by making the flexure regions 18 to have a relatively minimal thickness. In this regard, fixed portion 16 of the lapping carrier 10 is shown to have a nominal thickness $T_N$, while the flexure region has a reduced thickness $T_R$. The relative choices of $T_N$ and $T_R$ are determined by the row dimensions, by the available room, by material limitations and by the nature of the lapping operation. For example, if the row width is equal to the length of a pico slider (1.2 mm), and the allowable length for the flexure is 12 mm or more, then $T_N=T_R=1.2$ mm might be a possible choice for materials with a tolerance to strains of 0.1%. However, if the flexure is shorter and the row is wider, then one might choose a larger ratio for $T_N/T_R$. For ceramic materials it is generally desirable to have $T_R$ as large as possible. Typically, the ratio of $T_N$ : $T_R$ is at least 2:1, more typically at least 4:1, and preferably at least 10:1. In one particular embodiment, $T_R$ is on the order of 0.3 mm, while TN is on the order of 5 mm.

The row 1 is typically directly bonded to the movable elements 12. This may be carried out by interposing an epoxy or resin adhesive between the mounting surface 19 of the movable elements 12 and the row 1. For example, commercially available adhesive tape may be utilized to adhere the row 1 to the movable elements 12. Typically, the combined lapping carrier 10 and row 1 are heated to temperature so as to re-flow the epoxy tape, followed by subsequent cooling to effect a uniform bonding layer. In this regard, the row 1 may be weighted or loaded during the elevated temperature treatment so as to ensure formation of a bonding layer of a uniform thickness.

Typically, the actuating structure, and in particular the electromagnetic element 40 effects movement by generating magnetic fields that are repulsive or attractive to the permanent magnet, through signals that are processed from the row of MR elements. In particular, the MR electrical lapping guides provided in the kerf regions of the row are typically connected to a printed circuit board (not shown) and those signals are processed and sent to individual transducers. In this way, precise lapping operations may be carried out along individual portions of the row 1, such that optimal magneto-resistive properties are achieved throughout the entirety of the row 1 of MR elements.

Figure 4:
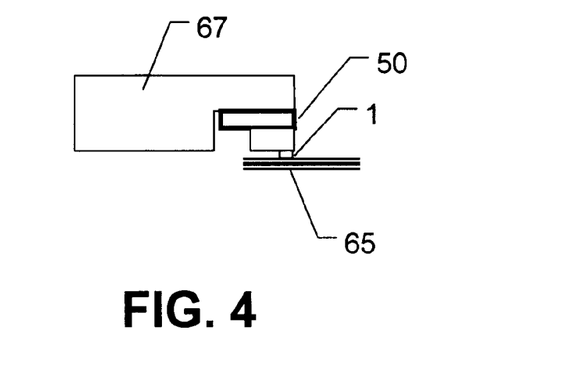
FIG. 4 illustrates a general sketch of an equipment layout utilizing a piezoelectric actuator.

FIG. 4 illustrates a general layout of the lapping toolset that incorporates a piezoelectric actuating element 50. Fixture 67 supports the piezoelectric actuating element 50, which in turn is positioned to exert a force on the lapping carrier that supports row 1. The lapping plate 65 is shown, in a position to lap the row 1. Lapping plate 65 typically carries an abrasive component to effect material removal from the row.

The use of a piezoelectric actuator reduces the mechanical complexity of voice-coil or similar mechanical components, with their attendant risks of failure and particle generation. Piezoelectric actuators usually require relatively high voltages to operate, and it is more convenient to integrate such components with materials with low electrical conductivities, such as those described hereinbelow.

While a particular embodiment of the present invention has been described above with respect to lapping carrier 10, the lapping carrier may take on widely varying configurations. For example, the lapping carrier may be formed of movable elements having an elongate structure (cross-sectional aspect ratio greater than about 2, such as 4 or greater) and be adapted to join to the stationary or fixed portion of the lapping carrier via flexure members that are disposed generally at opposite ends of the elongate movable members. One of the two opposite ends of the movable elements terminate to form a generally planar mounting surface, along which the row is bonded. The members are biased along their longitudinal axial direction, such that the opposing flexure regions deflect roughly the same degree and flex (which can be pictured as forming a parallelogram configuration). The lapping carrier may be made from a monolithic, heat treated and densified block of ceramic material (described in more detail below), and the elongate movable members may be defined by wire sawing. Here, the lapping carrier would have a cross-sectional shape (taken parallel to the longitudinal axial direction of movable elements and parallel to the plane along which wire sawing is effected to form individual movable elements) of an "E" without the central horizontal extension of the "E," or of a "D." In this regard, the movable elements generally form the vertical side of the "E" or the "D." As implied by these cross sectional shapes, the movable members form one side of the structure, while the side opposite may be open to define an exposed void (i.e., the "E" structure) or be closed but have an internal cavity (i.e. the "D" structure).

Whatever the particular construction of the embodiment, advantageously, the lapping carrier may have a high density of movable elements relative to MR elements or heads in the MR row. Typically, the ratio of movable elements to magneto-resistive elements of the row is at least 1:3, generally greater than 1:2, such as 1:1. In this way, individual MR head lapping may be precisely adjusted and controlled, in a real time lapping operation through a closed loop feedback process. In this regard, typically a signal from individual heads, typically resistance, is measured during lapping to closely control the degree of lapping. Typically, the transducer to movable element ratio is 1:1 to carry out individual biasing of movable elements.

Typically, at least the movable elements of the lapping carrier are formed of a ceramic material. It is generally desired that the movable elements and their associated flexure region are both are composed of a ceramic material. For ease of formation, substantially the entirety of the lapping carrier may be formed of a ceramic material. The particular form of the ceramic material is an important feature of the present invention, and is discussed in more detail below.

While certain embodiments call for a lapping carrier from a monolithic body, alternatively, lapping carriers may be formed from subcomponents or subassemblies and bonded together. For example, various portions may be made of ESD dissipative materials, formed, sintered and densified, for later stage bonding. The movable elements, such as in the form of elongate fingers, may be formed separately, and bonded to a main body portion using an appropriate jig for alignment. Bonding may be carried out by brazing, for example. Alternatively, bonding may be carried out by utilizing a glassy flux, solder, solid-solid diffusion, and other techniques. In the case of brazing, a low temperature braze, such as an active metal braze may be used, and example of which is a Sn braze with added active components to aid in adhesion such as Ag and Ti. In this case, typically, Sn is the majority component, and forms at least about 80 wt %, or at least 90 wt % of the braze. In embodiments using materials other than an ESD dissipative ceramic, most typically at least the mounting surface for the MR strip is formed of ESD dissipative ceramic.

Preferably, the ceramic material is formed of an electrostatic discharge (ESD) safe dissipative ceramic. The surface resistivity should range from $10^3$ to $10^{11}$ Ohm-cm, preferably from $10^4$ to $10^{10}$ Ohm-cm, more preferably from $10^5$ to $10^9$ Ohm-cm and most preferably from $10^6$ to $10^9$ Ohm-cm. These values are desirable in order to dissipate electrostatic charges. Typically, the material has good dissipation characteristics, such that the charges are dissipated quickly through the volume of part, and is sufficiently homogeneous to dissipate the charges evenly to avoid charge accumulations 'hot spots'.

The ESD dissipative ceramic may be lightly colored for ease of use, such as by optical handing equipment. The ESD dissipative ceramic may be adapted for hot isostatic processing (HIP) having substantially lower residual porosity compared to the pressureless sintered ceramics for high mechanical reliability, low contamination, and good machinability, and may be substantially non-magnetic. The material is generally a high-density ceramic (i.e., greater than 99% of theoretical density or "TD") suitable for ESD-dissipation applications. In certain embodiments, the density of the ceramic is greater than 99.5% of the theoretical density. Such ceramics have a volume resistivity in the range of $10^{5-10^{10}}$ ohm-cm, and also have high strength (i.e., greater than 500 MPa in the four point bending test; unless otherwise indicated here, flexural strength is measured by the 4 point bending test). The ceramics are formed by sintering in air and then, if necessary or desired, by hot isostatic pressing ("HIP" or "HIPing") wherein the HIP environment is preferably not oxidizing, but rather reducing, so as to prevent oxidation of HIP furnace components and/or the lapping carrier under fabrication. Typically, the HIP environment has an oxygen partial pressure that is less than $10^{-2}$ Torr. An example of a reducing environment includes use of inert gasses, such as noble gasses such as Ar, which may create a reducing atmosphere at high temperature in the presence of carbon furnace components. A second heat treatment (either sintering and/or HIPing) is designed to raise or lower the resistance such that the volume resistivity shifts (moves higher or lower) into the range $10^6$–$10^9$ ohm-cm. This secondary heat treatment may be carried out with predetermined oxygen partial pressure levels to oxidize components of the lapping carrier that may have been reduced during HIPing.

The ceramic may be prepared from stabilized (fully or partially stabilized) $ZrO_2$, advantageously with one or more conductive or semi-conductive additives selected from the group consisting of metal oxides, metal carbides, metal nitrides, or combinations thereof. Advantageously, component parts made using these ceramics have a decay time of less than 2 sec. The ceramic material may have a hardness greater than 8.5 GPa Vickers; with K1c greater than 4 MPa $m^{-1/2}$ and contain ZnO, preferably in range 15–25% (vol % of initial reagents) thereby forming a "light " color ceramic. One embodiment contains ZnO and up to about 10% (vol.) of a transition metal oxide. For example, manganese oxide (1–8 vol %) works well to produce a "dark" colored ceramic.

The ceramic material may contain $SnO_2$, preferably in range 20–80% (vol % of initial reagents). Other embodiments may contain ZrC or barium hexaferrite in the range 15–35 vol %. The ceramic may have an MOR retention of more than 50% after heat treatment in water at 200°–250° C. under equilibrium partial pressure.

According to another embodiment, there is provided a particulate composite based on Y-TZP (yttria partially stabilized tetragonal zirconia polycrystals) product 15–40% ZnO or 15–60% doped-$SnO_2$ for light colored ESD dissipating ceramics. The terms "light colored" means that the ceramic material is not black or another dark color. Preferred light colored materials are white, off-white, light grey, tan, and the like.

Y-TZP, optionally carrying a resistivity modifier, may advantageously be used for the lapping carrier due to its reliable mechanical properties. TZPs stabilized by other known stabilizers such as rare earth oxides, MgO, CaO, and mixtures thereof may be used as well.

Zirconia is generally insulative ($Rv=10^{13}$ Ohm-cm) at room temperature, but may be made more conductive by dispersing conductive particles to form electrodischarge machinable (or EDMable) compositions. Typically, particulate dispersoids include nitrides, carbides, borides, and silicides.

Conductive oxides may also be used to optimize the electrical resistivity of zirconia, such as transition metal oxides, $Fe_2O_3$, $Co_2O_3$, NiO, $Cr_2O_3$, etc. For example, 3–15 mol. % iron oxide can be doped to yttria-stabilized ceramics to provide an electrical resistivity of ~$10^5$ Ohm-cm at 250° C., noting, however, that some oxide additives alter the transformability of Y-TZP, deteriorating the fracture toughness. Transition metal oxides act as colorant in zirconia, forming characteristic dark colors, and may be subject to thermochemical redox reactions during the high temperature process such as sintering and HIPing. For instance, $Fe_2O_3$ in zirconia undergoes a thermochemical reduction during HIPing in inert gas, such as Ar, resulting in the formation of pores or cracking from gas forming reaction. HIPing in oxygen bearing gases prohibits such deleterious reactions but it is not cost effective due to high cost of platinum heating element and special kiln furniture.

Both conductive and semiconductive phases can be used as resistivity modifier to tailor the resistivity and dissipation characteristics. Some resistivity modifier can react with Y-TZP to form new phases resulting in insulative properties and/or changing the transformability of Y-TZP. Such modifiers should be avoided. The resistivity modifier should satisfy as many requirements as possible listed below to be successfully used in various applications:

Pressureless sinterability and sinter-HIPability, good machinability, and structural reliability Coloration Low particle generation Tunable ESD properties High corrosion resistance Desired magnetic properties.

It has been found that light colored ESD dissipative ceramics can be prepared by dispersing ZnO grains in Y-TZP matrix. Further, doped $SnO_2$ in Y-TZP is also effective to achieve a light colored material with the desired resistivity. A few dark colored (or black) ESD dissipative ceramics have also prepared by adding $LaMnO_3$, $LaCrO_3$, ZrC and $BaFe_{12}O_{19}$ in Y-TZP.

Magnetic susceptibilities of resistivity modifiers may vary. (Magnetic susceptibility is defined as the ratio of the intensity of magnetism induced in a material to the magnetizing force or intensity to field to which is subjected.) ZnO, $SnO_2$, $ZrO_2$, $Y_2O_3$, $Al_2O_3$, ZrC and SiC have very low molar magnetic susceptibility of less than $10^{-4}$ ml/mol. On the other hand, $Fe_2O_3$ and $BaFe_{12}O_{19}$ exhibit high molar magnetic susceptibility of greater than $10^{-2}$ ml/mol. Some materials such as $LaMnO_3$ and $LaCrO_3$ show medium molar magnetic susceptibility. The modifiers with low magnetic susceptibility are particularly suitable for the present lapping carrier to minimize electromagnetic interference.

Finally, the volume percentages (Vol %) of components disclosed herein are based upon currently available commercial grades of materials. These numbers may be varied if other materials are employed—e.g., nano-size particles would result in lower Vol % values, as low as 5 vol %.

The ceramic composition may also include a small amount (e.g., less than about 2 wt. %) of one or more sintering aids, grain growth inhibitors, phase stabilizers, or additives selected from the group consisting of CaO, MgO, SrO, BaO, $Al_2O_3$, $Fe_2O_3$, NiO, CuO, $SiO_2$, $TiO_2$, $Na_2O$, $K_2O$, $CeO_2$, $Y_2O_3$ and mixtures thereof. The amount of additives should be small enough not to alter desirable properties for ESD dissipative ceramics. In some cases, limited amounts of these oxides may be incorporated from raw materials and/or contamination during the powder processing.

Preferably, the ceramic composition is substantially pore free after that treatment, particularly in relative numbers, e.g., more than 90% pore free—based upon pore sizes greater than 0.5 $\mu$m. As used herein, the terms "pore free" and "substantially pore free" may also be defined as a relative density greater than 99%, most preferably greater than 99.5%.

Preferably, the ceramic composition has high flexural strength. Sinter-HIPed TZP materials with ZnO, $SnO_2$, LaMnO$_3$, and LaCrO$_3$ are strong, having flexural strength of 1,000, 650, 716, and 1,005 MPa, respectively (according to the 4 point bending test).

The ceramic composition may have a color lighter than black. As used herein, the preferred "light" color is defined as being lighter than the midpoint of 16 grey scale as defined by ISO. Color can also be measured using a color meter for more quantitative measurements. The ceramic compositions containing ZnO and SnO$_2$ compositions show light colors, while most others are black or very dark.

The ceramic composition may have a voltage decay time (a measure of the performance of ESD dissipative ceramics) of less than 500 ms, most preferably less than 100 ms. It may also have a low transient current, such as less than 100 mA, most preferably less than 50 mA.

The dense lapping carrier generally comprises TZP as a base component and particulate dispersoids which include at least one selected from conductive or semiconductive oxides, carbides, nitrides, oxycarbides, oxynitride, oxycarbonitrides, and the like. The resistivity modifiers may be doped with additives or pre-alloyed to desired crystalline form and/or resistivities. When the amount of resistivity modifier is greater than 60 vol. %, it is difficult to take advantage of high fracture toughness and flexural strength of TZP. When the amount of conductivity modifier is less than 10 vol. %, it may be difficult to achieve the desired ESD dissipating properties. Suitable ranges of resistivity modifiers generally include 10–60, 15–50, 20–40 and 25–30 vol. % and include ranges that overlap these values.

The average particle sizes of ceramic powders forming the lapping carrier are generally smaller than 1 $\mu$m to achieve a homogeneous microstructure and uniform electrical properties and desired dissipation characteristics. Pre-alloyed powders may be milled in a plastic jar with Y-TZP milling media to obtain desired particle size. Powders were mixed by a wet milling in a plastic jar mill with Y-TZP milling media, followed by drying and granulation.

A dense lapping carrier may be prepared by molding a mixture of Y-TZP powder and conductivity modifier powders into any desired shapes by any molding methods such as dry pressing, slip casting, tape casting, injection molding, extrusion, and gel casting. An organic binder system may be added into the powder mixture to achieve a high green strength for handling, green machining, and to maintain shapes during the densification. Of these techniques, molding, and in particular, injection molding, are preferred techniques for forming the ceramic green body. Typically, the green body is in a near-net shape.

The molded ceramic lapping carrier is debinderized and sintered in air or desired reactive or inert atmosphere to greater than 95% T.D., preferably to greater than 97% T.D. The sintered lapping carrier can be further densified by hot isostatic pressing in inert gas or oxygen bearing inert gas to full density. The thus obtained sintered or sinter-HIPed ceramic article may exhibit a volume resistivity of from 1×10$^3$ to 1×10$^{12}$ Ohm-cm in ambient temperature.

Final processing is carried out by machining the sintered/heat treated lapping carrier into its final dimensions and contours. The movable elements made be provided in an as-molded form, but more typically, the movable elements are formed by slicing via a wire sawing technique, which has precise control of pitch and dimensions of the movable elements, and which forms uniform gaps between adjacent movable elements. Typically, the gap that extends between movable elements has a width of not greater than about 200 $\mu$m. The flatness of the mounting surface may also be precisely machined according to embodiments of the present invention. Preferably, the mounting surface has a flatness of less than about 10 $\mu$m, more preferably not greater than about 2 $\mu$m.

Characterization Methods:

Density was measured by the water displacement method with temperature and atmospheric pressure corrections. Microstructure was observed by optical and scanning electron microscopes on polished cross-section of samples prepared by a standard polishing procedure. Color was measured by Miniscan XE Plus available from Hunter Associates Laboratory, Inc., Reston, Va., using 45°/0° optical geometry and 7.6 mm aperture. X-ray diffraction (XRD) was used to determine crystalline phases of powders and densified ceramics. Young's modulus, shear modulus and Poisson's ratio of ceramics were measured by a pulse-echo method using ultrasonic transducers. Hardness was determined by Vickers hardness method at loadings of 5 to 20 Kgf. 4-point flexure strength was determined by a method specified in ASTM C1160-02b (2002) using 3×4×50 mm type-B specimen. Assuming a Weibull modulus of about 10, it is estimated that this method reports a flexural strength that is about 20% lower than that found using JIS R 1601-81 (3-point flexure test using 30 mm span). Average strength of 5 to 15 bars were reported. Fracture toughness was determined by an indentation crack length method using Vickers indenter at loadings of 10 to 40 Kgf. An indentation crack strength method was also used in some occasions.

Volume and surface resistivities (DC) were determined according to methods specified by the ASTM, and others at 10 or 100 V. The surface was ground by a diamond wheel and cleaned in a ultrasonic bath prior to the resistivity measurement. As an electrode, type 1215 silver-loaded conductive rubber sheet about 0.55 mm thick made by Chomerics Inc. of Woburn, Mass., was used. Voltage decay time is a measure of charge dissipation and is determined by methods described in literature.

In fabricating the lapping carrier, the ESD dissipative material is generally employed as the entire component part, such as in the case of a monolithic component, although certain portions of carrier may be formed of other materials. Persons having ordinary skill in each respective component art can readily adapt the ESD dissipative materials specific requirements.

The following examples were prepared for characterization.

EXAMPLE 1

ZnO

A Y-TZP powder containing about 2.8 mol % yttria (YZ110) available from Saint-Gobain Ceramics & Plastics (SGC&P) was mixed in water with varying amounts of zinc oxide available from Zinc Corporation of America in ajar mill with Y-TZP milling media. The surface areas of YZ110 and ZnO powders were 7 and 20 m$^2$/g, respectively, prior to milling. The milled powder was granulated by a laboratory method to pressable powder. The powder was uniaxially pressed into steel molds at 40 MPa, and then cold isostatically pressed (or "CIPed") at 207 MPa to form green bodies.

The green bodies were sintered at 2° C./min to a desired sintering temperature (1350°–1500° C.) for 1 hr to achieve a sintered density of greater than ~97% TD (theoretical density). The theoretical density was calculated by a mixing rule based on volume % of ingredients assuming no reaction between two phases during the sintering. Some sintered bodies were HIPed in Ar at 1300° C. for 45 min to achieve the full density. All samples were HIPed to greater than 99.5% T.D., mostly greater than 99.8% T.D.

The resulting densified bodies by sintering and sinter-HIPing were measured for density, Young's modulus, hardness, strength, fracture toughness, phase microstructure, volume and surface resistivities, and ESD dissipation (voltage decay) as summarized in Tables 1 and 2.

Effect of ZnO Content and Grain Size:

Table 1 summarizes volume resistivities as a function of vol. % ZnO in Y-TZP of pressureless sintered samples. It is noted that the resistivities for the ESD dissipation ($10^3 < Rv < 10^{12}$ Ohm-cm) can be achieved by composite materials with 15–35 vol. % ZnO and 85–65 vol. % Y-TZP. These sintered materials can be prepared to greater than 99% T.D. at 1400°–1450° C. for 1–2 Hr. in air.

Sample No. 16 was prepared with a Y-TZP powder containing 3 mol % yttria (HSY3.0) and sintered at 1250° C., which is 150° C. lower temperature than others, to minimize the grain growth of ZnO. It is noted that the volume resistivity of this sample is 5 orders of magnitude lower than Sample No. 2. The present result indicates the fine grain size of conductive phase (ZnO) by low temperature sintering is favorable to achieve a lower resistivity. Further, it is believed that the amount of modifier could be lower by low temperature sintering and reduced grain growth to achieve the same ESD dissipative resistivity.

Effect of Annealing Temperature and Atmosphere:

Surprisingly, the resistivity of Sample No. 8 after HIPing at 1350° C./207 MPa for 45 min showed a significant reduction from $7 \times 10^{11}$ to $5 \times 10^3$ Ohm-cm. Samples No. 9–14 show the effect of heat treatment (annealing) in air on the resistivity of HIPed 20 vol. % ZnO/YZ110 composites showing the tunability of resistivity by a simple heat treatment. These results further indicate that it is not necessary to prepare various compositions to cover a broad range of resistivities for various ESD dissipative applications. Annealing at different atmospheres (Sample No. 15) also provide additional means to achieve the tunable resistivity with this composition.

An over-annealed sample with Rv of $5 \times 10^6$ Ohm-cm was annealed at 890° C. for 5 Hr. in 2% $H_2/N_2$ atmosphere, resulting in a resistivity of $5 \times 10^6$ Ohm-cm. This result indicates that the resistivity control of this material is reversible. Accordingly, it is believed that the desired resistivity can be achieved by composition, annealing in air, and/or annealing in a controlled atmosphere.

Transient Current and Voltage Decay Time:

Samples of composition 20% and 25% ZnO/YZ110 were prepared and were heat treated in air at temperatures in the range 600°–650° C. to give the resistivity values shown below.

To make a measurement, a plate (which is part of a charged plate monitor) is charged to a fixed voltage. This loads the plate with about 7 nC of charge at 350 V. This charge is then dissipated to ground by touching the sample with the movable contact. The peak transient current is determined from the peak voltage seen from the current probe by the oscilloscope, which records voltage every nanosecond.

Decay time is measured by reading the voltage output of the charged plate monitor on a digital oscilloscope as a function of time. The time for the voltage to fall from 900 V to 100 V is measured from the oscilloscope after initial charging to 1,000 V. Instrument electronics set a limit of 25 ms as the shortest measurable decay time. The following results were obtained:

TABLE 2

| Sample | Volume resistivity (Ohm-cm) | Peak current at 400 V (mA) | Peak current at 500 V (mA) | Decay time (ms) |
| --- | --- | --- | --- | --- |
| #18 (20% ZnO) | $7.7 \times 10^5$ | 1.6 | 16 | less than 25 |
| #10 (20% ZnO) | $2.2 \times 10^6$ | less than 1 | 14.7 | less than 25 |
| #11 (20% ZnO) | $1.6 \times 10^8$ | Not measured | 1 | 43 |
| #34 (25% ZnO) | $3.1 \times 10^9$ | less than 1 | 2.0 | Not measured |

Table 3 summarizes properties of 20 vol. % ZnO/YZ110 composition after HIPing. The material is highly dense with a relative density of greater than 99.5% T.D. with a light yellow color (lighter than 50% of 16 gray scale), mechanically strong with a flexural strength of the material of 1 GPa, substantially safe with low transient current, and highly dissipative with a decay time from 1000V to 100V is typically less than 50 ms. Accordingly, the material should be good for the ESD dissipative ceramics. Further, the residual magnetic flux density of this material is substantially negligible due to the absence of Fe, Co, Ni, and Cr-oxides in the composition.

TABLE 1

| ID # | Zirconia type | ZnO (Vol %) | Densification (Method/Temp.) | Heat treatment (Temp/time) | (Atm.) | Rv (Ohm-cm) |
| --- | --- | --- | --- | --- | --- | --- |
| 1 | YZ110 | 15 | S/1400° C.* | — | — | 2.0E12 |
| 2 | YZ110 | 20 | S/1400° C. | — | — | 7.4E11 |
| 3 | YZ110 | 25 | S/1400° C. | — | — | 5.6E10 |
| 4 | 2.6YTZP | 25 | S/1400° C. | — | — | 7.6E09 |
| 5 | 2.6YTZP | 30 | S/1400° C. | — | — | 9.1E07 |
| 6 | YZ110 | 30 | S/1400° C. | — | — | 7.9E06 |
| 7 | 2.6Y-TZP | 35 | S/1400° C. | — | — | 6.9E04 |
| 8 | YZ110 | 20 | H/1350° C.** | — | — | 5.0E03 |
| 9 | YZ110 | 20 | H/1350° C. | 560° C./5 Hr | Air | 4.0E04 |
| 10 | YZ110 | 20 | H/1350° C. | 585° C./5 Hr | Air | 9.0E04 |
| 11 | YZ110 | 20 | H/1350° C. | 600° C./5 Hr | Air | 1.7E06 |
| 12 | YZ110 | 20 | H/1350° C. | 630° C./5 Hr | Air | 5.0E06 |
| 13 | YZ110 | 20 | H/1350° C. | 680° C./5 Hr | Air | 1.3E11 |
| 14 | YZ110 | 20 | H/1350° C. | 630° C./24 Hr | Air | 2.5E11 |
| 15 | YZ110 | 20 | H/1350° C. | 810° C./2 Hr | 2% H2/N2 | 6.0E06 |
| 16 | HSY3.0 | 20 | S/1250° C. | | | 2.9E06 |

S*: pressureless sintering in air, H**: HIPing in argon

TABLE 3

| Property Name | SI Units | (Mean values) | Test method |
|---|---|---|---|
| Color | | Light yellow- | Visual/color meter |
| Density | g/cm$^3$ | 5.99 | Water displacement |
| Porosity | % | less than 0.5% | Density and polished surface |
| Grain size | μm | 1 | Linear intercept |
| Young's Modulus, 20° C. | GPa | 195 | Ultrasonic wave velocity |
| Hardness - Vickers, 20° C. | GPa | 9.2 | Vickers hardness at P = 20 Kgf |
| Flexural Strength, 20° C. | MPa | 1000 | 4-point bending, ASTM-C1161-90 |
| Fracture Toughness, 20° C. | MPam$^{1/2}$ | 5.9 | Indentation crack length |
| Fracture Toughness, 20° C. | MPam$^{1/2}$ | 4.2 | Indentation strength at P = 40 Kgf |

EXAMPLE 2

SnO$_2$

A Y-TZP powder (HSY3.0) containing about 3 mol % yttria available from Zirconia Sales of America was mixed with varying amount of tin oxide (SnO$_2$, T1186)[18] available from SGC&P in ajar mill with Y-TZP milling media. The powder has nominal dopants of 1% Sb$_2$O$_3$ and 0.5% CuO for improved conductivity. Prior to the mixing the doped tin oxide was milled to surface area of ~15 m$^2$/g. Surface area of Y-TZP was 7 m$^2$/g prior to milling. Another commercial tin oxide powder (available from Alfa Aesar, Ward Hill, Mass.) milled to a surface area of 12 m$^2$/g was also used. The milled powder was granulated by a laboratory method to pressable powder. The powder was uniaxially pressed into steel molds at 40 MPa, and then CIPed at 207 MPa to form green bodies. The green bodies were sintered at 2° C./min to a desired sintering temperature (1400–1500° C.) for 1 hr to achieve a sintered density of greater than ~95% T.D. The theoretical density was calculated by a mixing rule based on the composition assuming no reaction between two phased during the sintering. Some sintered bodies were HIPed in Ar at 1400° C. for 45 min to achieve the full density.

The resulting densified bodies by sintering and sinter-HIPing were measured for density, Young's modulus, hardness, strength, fracture toughness, phase microstructure, volume and surface resistivities, and ESD dissipation (voltage decay).

The pure SnO$_2$ is an insulative material. It was confirmed that compositions of 10–50% SnO$_2$/Y-TZP are insulative, Rv=10$^{13}$ Ohm-cm, as shown in Table 4. A limited heat treatment in Ar and N$_2$ in a tube furnace did not show a significant decrease in the resistivity. The color was remained as light grayish, lighter than 50% of 16 gray scale. A HIPed sample at 1400° C./207 MPa/60 min in Ar turned into a medium gray and showed resistivities of ~10$^7$ Ohm-cm.

TABLE 4

| | SnO$_2$ (Vol %) | Densification (Method/Temp.) | Rv (Ohm-cm) |
|---|---|---|---|
| Undoped | 10 | S/1450° C.* | 1.2E13 |
| Undoped | 20 | S/1450° C. | 1.5E13 |
| Undoped | 30 | S/1450° C. | 3.7E13 |
| Undoped | 35 | S/1450° C. | 3.4E13 |
| Doped | 50 | S/1450° C. | 6.5E12 |
| Doped | 50 | H/1350° C.** | 6.1E07 |
| Doped | 50 | H/1300° C.** | 2.6E07 |

S*: pressureless sintering in air, H**: HIPing in argon

Properties of HIPed 50% doped-SnO$_2$/HSY3.0 were measured as summarized below. The material shows light to medium grey. The material is stiffer and harder than those of 20 vol. % ZnO/YZ110 which are similar to those of typical Y-TZP's. In addition, the material is also substantially non-magnetic.

TABLE 5

| Property Name | SI Units | (Mean values) | Test method |
|---|---|---|---|
| Color | | Light gray | Visual/color meter |
| Density | g/cm$^3$ | 6.43 | Water displacement |
| Porosity | % | less than 1% | Density and polished surface |
| Grain size | μm | 1 | Linear intercept |
| Young's Modulus, 20° C. | GPa | 224 | Ultrasonic wave velocity |
| Hardness - Vickers, 20° C. | GPa | 11.4 | Vickers hardness at P = 20 Kgf |
| Flexural Strength, 20° C. | MPa | 650 | 4-point bending, ASTM-C1161-90 |
| Fracture Toughness, 20° C. | MPa m$^{1/2}$ | 3.9 | Indentation crack length |
| Fracture Toughness, 20° C. | MPa m$^{1/2}$ | 3.9 | Indentation strength at P = 40 Kgf |

EXAMPLE 3

LaMnO$_3$

A batch of LaMnO$_3$ was prepared by the solid-state reaction of an equimolar powder mixture of La$_2$O$_3$ and Mn$_2$O$_3$ at 1400° C. for 2 hr in air. The XRD of reaction formed powder indicated a well developed LaMnO$_3$, a perovskite family. The reaction formed powder was milled in a plastic jar mill with Y-TZP milling media to BET surface area of 15 m²/g. A batch of 30 vol % LaMnO₃/3Y-TZP was processed using mixtures of LaMnO₃ and Y-TZP (YZ110, SGC&P, Worcester, Mass.) followed by the same preparation method described in Example 1.

Samples were sintered at 1250°–1350° C. to greater than 98% T.D. The density of low temperature (1225° C.) sintered samples was greater than 97% T.D. Sintered samples were HIPed at 1175° and 1350° C. at 207 MPa of argon to full density. The high temperature (1350° C.) sinter-HIPed samples show a significant grain growth, formation of reaction phase, lanthanum zirconate ($La_2Zr_2O_7$), and a few minor surface cracks. The low temperature HIPed samples show a much smaller grain size and no indication of bloating or cracking. Both sintered and HIPed samples were black. While it is thought that some perovskite-type compounds such as $LaMnO_3$ and $LaFeO_3$ are not chemically stable in combinations with partially stabilized zirconias and at typical sintering temperatures form secondary zirconia compounds such as $La_2Zr_2O_7$ thus affecting the phase stability of the remaining zirconia alloy, the present results indicate that $LaMnO_3$ can be successfully used to prepare a composite with Y-TZP with a low temperature sintering.

Microstructural observations by SEM from a polished cross section of low temperature sintered sample indicates that the grain size of the material is less than 1 $\mu$m. The XRD from a polished cross section also indicated that the majority of tetragonal zirconia was retained with negligible reaction to form lanthanum zirconate ($La_2Zr_2O_7$), which is an insulator. The present results indicate that a tough, black ESD dissipative zirconia can be prepared by mixing $LaMnO_3$ in Y-TZP by a low temperature sintering.

The effect of HIPing on the volume resistivity was also determined. Unlike other materials described in Examples 1 and 2, the volume resistivity of the material was not changed before and after sintering. It is believed that various doped $LaMnO_3$ and $LaBO_3$ (B=Al, Mn or Co)[19, 20] family can be used as semiconductive dispersoids in zirconia.

EXAMPLE 4

$LaCrO_3$

A batch of $LaCrO_3$ was prepared by the solid-state reaction of an equimolar powder mixture of $La_2O_3$ and $Cr_2O_3$ at 1400° C. for 4 hr in air. The XRD of reaction formed powder indicated a well developed $LaCrO_3$. The reaction formed powder was milled in a plastic jar mill with Y-TZP milling media to BET surface area of 15 m²/g. A batch of 30 vol % $LaCrO_3$/3Y-TZP was processes using mixtures of $LaMnO_3$ and Y-TZP (HSY-3.0, Zirconia Sales of America, Atlanta, Ga.) followed by the same preparation method described in Example 1. Samples were sintered at 1450°–1500° C. in air to greater than 97% T.D. and showed a dark green color with a volume resistivity of 9×10³ Ohm-cm. Sintered samples were HIPed at 1450° C. at 207 MPa of argon to full density. The color of HIPed samples became slightly lighter than that of sintered only.

Microstructural observations by SEM from a polished cross section indicate that the grain size of the material is about 1 $\mu$m. The XRD from a polished cross section also indicated that the majority of tetragonal zirconia was retained with no measurable reaction to form lanthanum zirconate. The present results indicate that a dense, tough, dark colored ESD dissipative zirconia can be prepared by mixing $LaCrO_3$ in Y-TZP by sinter-HIPing.

TABLE 6

| $ZrO_2$ type | $LaMnO_3$ (Vol %) | Densification (Method/Temp.) | Rv (Ohm-cm) |
|---|---|---|---|
| YZ110 | 20 | S/1250° C.* | 1.2E11 |
| YZ110 | 25 | S/1250° C. | 1.5E08 |
| YZ110 | 30 | S/1250° C. | 3.7E07 |
| YZ110 | 30 | H/1175° C.** | 6.1E07 |
| YZ110 | 30 | H/1200° C.** | 2.6E07 |
| YZ110 | 30 | S/1400° C. | 2.8E11 |
| YZ110 | 30 | H/1350° C.** | 6.4E12 |

S*: pressureless sintering in air, H**: HIPing in argon

TABLE 8

| $ZrO_2$ type | $LaCrO_3$ (Vol %) | Densification (Method/Temp.) | Heat treatment (Temp/time) | (Atm.) | Rv (Ohm-cm) |
|---|---|---|---|---|---|
| 3.0Y-TZP | 10 | S/1550° C. | | | 1.0E11 |
| 3.0Y-TZP | 20 | S/1550° C. | | | 3.5E10 |
| 3.0Y-TZP | 30 | S/1550° C. | | | 1.7E07 |
| 3.0Y-TZP | 40 | S/1550° C. | | | 2.0E06 |
| 3.0Y-TZP | 30 | H/1400° C.** | — | — | 1.2E12 |
| 3.0Y-TZP | 30 | H/1400° C.** | 1400 C./1 Hr | Air | 5.4E06 |

S*: pressureless sintering in air, H**: HIPing in argon

TABLE 7

| Property Name | SI Units | (Mean values) | Test method |
|---|---|---|---|
| Color | | Light gray | Visual/color meter |
| Density | g/cm³ | 6.13 | Water displacement |
| Porosity | % | less than 0.5% | Density and polished surface |
| Grain size | $\mu$m | 1 | Linear intercept |
| Young's Modulus, 20° C. | GPa | 182 | Ultrasonic wave velocity |
| Hardness - Vickers, 20° C. | GPa | 11.8 | Vickers hardness at P = 20 Kgf |
| Flexural Strength, 20° C. | MPa | 716 | 4-point bending, ASTM-C1161-90 |
| Fracture Toughness, 20° C. | MPam^{1/2} | 4.2 | Indentation crack length |
| Fracture Toughness, 20° C. | MPam^{1/2} | 3.6 | Indentation strength at P = 40 Kgf |

TABLE 9

| Property Name | SI Units | (Mean values) | Test method |
|---|---|---|---|
| Color | | Dark green | Visual/color meter |
| Density | g/cm$^3$ | 6.27 | Water displacement |
| Porosity | % | less than 0.5% | Density and polished surface |
| Grain size | μm | 1 | Linear intercept |
| Young's Modulus, 20° C. | GPa | 228 | Ultrasonic wave velocity |
| Hardness - Vickers, 20° C. | GPa | 12 | Vickers hardness at P = 20 Kgf |
| Flexural Strength, 20° C. | MPa | 1020 | 4-point bending, ASTM-C1161-90 |
| Fracture Toughness, 20° C. | MPam$^{1/2}$ | 4.8 | Indentation strength (3.0Y-TZP) |
| Fracture Toughness, 20° C. | MPam$^{1/2}$ | 5.7 | Indentation strength (2.5Y-TZP) |
| Fracture Toughness, 20° C. | MPam$^{1/2}$ | 8.9 | Indentation strength (2.0Y-TZP) |
| ESD voltage decay time | ms | 70 | From 1000V |

The resistivities were measured before and after HIPing. A significant increase, up to 3 orders of magnitude, in resistivity after HIPing was found. The thermal annealing in air at 1400° C./60 min in air reproducibly recover the resistivity back to the sintered value as summarized in Table 8.

EXAMPLE 5
Zirconium Carbide (ZrC)

Similarly, ZrC can be mixed with Y-TZP to prepare dense, semi-insulative, ESD dissipative ceramics as listed in Table 10. The semi-insulating compositions were prepared by mixing 10 to 20 vol % of ZrC in Y-YZP (HSY3.0). ZrC does not react with $ZrO_2$ during the hot pressing at 1550° C./20 MPa in argon using graphite dies. The color of hot pressed ZrC was black. The resulting composite is stiffer and harder than $ZrO_2$. Accordingly, the semi-insulating materials with ZrC is slightly stiffer and harder than Y-TZP can be prepared with ZrC.

TABLE 10

| ZrC | 3Y-TZP (Vol. %) | Hot Pressing (Temp./Hr) | Rv (Ω-cm) |
|---|---|---|---|
| 10 | 90 | 1550° C./1 H | 1.3E12 |
| 11.5 | 88.5 | 1550° C./1 H | 7.0E11 |
| 12.5 | 87.5 | 1550° C./1 H | 5.2E11 |
| 13.5 | 86.5 | 1550° C./1 H | 3.7E09 |
| 15 | 85 | 1550° C./1 H | 5.4E04 |
| 20 | 80 | 1550° C./1 H | 3.7E04 |
| 25 | 75 | 1550° C./1 H | 2.3E00 |

EXAMPLE 6
Aluminum Nitride (AlN)

This example shows another ceramic material—aluminum nitride—that can be heat-treated to be suitable for static dissipation. A 12×12×1 mm square of aluminum nitride was procured from SGCP (Carborundum). Surface resistance was measured to be greater than $10^{10}$ ohms. This is too high to be able to dissipate charge effectively. The sample was then heat treated in argon at 1900° C. for 20 minutes and cooled rapidly to room temperature at a rate more than 10° C./minute. The surface resistance was measured again on both sides. It was about $2×10^9$ ohms, which is in the range suitable for dissipating static electricity.

EXAMPLE 7
Complex Oxides—$BaO\ 6Fe_2O_3$

Complex oxide compounds such as barium hexaferrite ($BaO\ 6Fe_2O_3$) can also be mixed with Y-TZP (YZ110) to prepare dense, semi-insulative, ESD dissipative ceramics. The semi-insulating compositions were prepared by mixing 25 vol % of $BaO\ 6Fe_2O_3$ ($BaFe_{12}O_{19}$) in Y-YZP (YZ110). The composition can be sintered at 1300°–1400° C. for 1 Hr. in air to greater than 98% TD. The volume resistivity of the sintered disks was $2×10^7$ Ohm-cm. Barium hexaferrite is known as a strong magnetic material. The sintered composite was easily attracted by a permanent magnet indicating a good retainablilty of $BaO\ 6Fe_2O_3$ phase in fine zirconia matrix.

EXAMPLE 8
Low Temperature Degradation (LTD) Resistant ESD Safe Ceramics

Y-TZP low temperature degradation (LTD) behavior is a significant limitation for some wear resistant applications at low temperature regime (150°–300° C.). The tetragonal zirconia polycrystals (TZP) transform to monoclinic zirconia polycrystals resulting in volume expansion and microcracking at the low temperature regime. Such transformation can be worst in the presence of humidity, especially under equilibrium steam pressure. An accelerated test has been used to determine the LTD behavior of Y-TZPs as described in U.S. Pat. No. 6,069,103, which is hereby incorporated herein by reference.

MOR bars were autoclaved at 200° and 250° C. under equilibrium steam pressure for 48 hours in an autoclave, followed by 4-point bending strength measurement. Table 11 shows flexural strength of 20 vol. % ZnO/YZ 110 after the autoclave treatments. The results indicate that the resistance to LTD of 20ZnO/YZ 110 is significantly better than that of typical Y-TZP (TZ-3Y, available from Tosoh, Japan). The improved LTD resistance over Y-TZP is desirable using ESD dissipative, zirconia ceramics in degrading environments.

TABLE 11

Flexural strength after autoclave treatment for 48 hours.

| | Flexural strength (MPa) | |
|---|---|---|
| Autoclave temperature (° C.) | 20 ZnO/YZ110 | TZ3Y |
| 20 | 1050 | 1507 |
| 200 | 574 | 474 |
| 250 | 744 | 590 |

EXAMPLE 9
Low Particle Generation

Twenty (20) ZnO/YZ110 samples of disk and square shapes were tumble finished by rolling in a ten sided mill for 72 hours with quartz or silicon carbide media. Some samples were lapped or polished to smoother surface finish to determine the effect of surface finish on the particle generation. A white light interference microscope, Zygo NewView 100, was used to measure surface roughness (Ra) after this tumble finish treatment.

Samples of the 20 ZnO/YZ110 with various surface finishes were tested with a liquid particle counter (LPC). A sample with 3×4×25 mm in size (machined MOR bar) and surface finish of 3800 Å was used as a baseline. Samples were cleaned using a standard procedure used to clean burnish/glide heads for magnetic disk media. A Crest ultrasonic bath was used to dislodge particles from the samples into water (68 kHz for 30 sec.). Liquid particle counts were taken from this water using an LS-200 PMS. The results were normalized by surface area of test sample and reported as number of particles per cm$^2$.

The baseline sample with Ra of greater than 3000 Å showed about greater than 600 particles/cm$^2$. The treated samples significantly reduced number of particles as a function of surface finish as shown in Table 12. Rougher surfaces typically generate more particles in sliding friction or physical impact applications due to the abrasive nature of the surface and the material used. Decreasing the surface roughness of 20 ZnO/YZ110 by tumble finish, fine grinding, lapping or polishing reduces its potential for particle generation.

TABLE 12

LPC results as a function of surface finish.

| Surface finish | Ra (Å) | LPC (particles/cm$^2$) |
|---|---|---|
| Baseline | greater than 3000 | greater than 600 |
| Tumble finish | 2250 | 250 |
| Tumble finish | 1500 | 120 |
| Fine grinding | 1000 | 78 |
| Lapping | 500 | 37 |
| Polishing | 20 | 20 |

Tumbling is a low cost, industrial process to clean asperities and burrs. Ceramic thread guides are tumble finished to Ra of 100 Å. The present results indicate that ESD dissipative ceramics can be prepared to very low LPC by HIPing and optimum surface finish.

EXAMPLE 10

Color Measurements

Color measurements were made using two separate methods. First, lightness of color was judged using a 16 level gray scale ranging from white to black. Measurements were also made with a Hunterlab Miniscan XLE calorimeter, made by Hunter Associates Laboratory of Reston, Va. The instrument illuminates the sample target with diffuse illumination and observes the reflected light at an 8 degree angle with a spectrophotometer covering the range 400–700 nm. Output from the colorimeter was presented using the CIE 1976 L*a*b* scale, wherein:

L* measures lightness and varies between 0 and 100 (100 is white/1 is black);

a* measures redness when positive, gray when zero and greenness when negative;

b* measures yellowness when positive, gray when zero and blueness when negative.

We noted that the 50% point on the gray scale corresponded to values of L* higher than 50.

TABLE 13

CIE Measurement Results

| Sample | Processing | Density (% theoretical) | Resistivity (MΩ-cm) | L* | a* | b* |
|---|---|---|---|---|---|---|
| A | 1250 C./1 hr sinter, 1200 C./45 min HIP | 99.0 | 0.0012 | 75.28 | −6.07 | 10.63 |
| B | 1250 C./1 hr sinter, 1200 C./45 min HIP | 99.0 | 0.0014 | 69.06 | −5.1 | 2.53 |
| As above, after 4 hrs/580 C. in air | | | 10.7 | 86.07 | −4.81 | 15.94 |
| C | 1400 C./1 hr sinter, 1350 C./45 min HIP | >99% | 3 | 79.61 | 2.62 | 48.21 |
| Kyocera (comparative) | (As supplied) | unknown | 10 | 44.03 | −0.04 | −0.32 |

The first two samples (A and B) were made from the HSY3.0 zirconia source and sample C from YZ110. The Kyocera sample was a commercially obtained sample.

The lapping carriers can be manufactured with ESD dissipative ceramics disclosed in Examples 1–7. An example of such material is 20 Vol % ZnO-YZ110 disclosed in Example 1. The prepared blanks are machined into exact shapes and tolerances using diamond grinding wheels and wire sawing. Critical dimensions are inspected with optical instruments down to 1 μm precision. The straightness and flatness of movable elements are also inspected by optical and contact measurement equipment. If one or more movable elements are out of flat or straight greater than 10 μm due to permanent deformation the yield from the lapping carriers could be deteriorated significantly. Flatness is generally measured by a laser interferometry or profilometer with a diamond stylus. Metals, unlike ceramics, are subjected to permanent deformation from higher than the yield point. On the other hand, all ceramics disclosed in Examples 1–7 do not exhibit the permanent deformation at ambient temperature. Therefore, the yield loss from deformation (or permanent memory) in movable elements during the manufacturing or after deployment and use can be reduced according to embodiments of the present invention.

According to embodiments of the present invention, lapping carriers are provided that have superior properties as compared to state of the art lapping carriers, such as those made from metals and metal alloys such as stainless steel. The lapping carriers according to embodiments herein have superior electrostatic discharge properties due to use of materials as detailed herein. In addition the present inventors have found that the lapping carriers offer superior memory. That is, the movable elements of the present lapping carriers more consistently and resiliently move back to nominal, unloaded positions when not biased by the transducers. The lapping carrier is resistant to plastic deformation after repeated actuation. This characteristic is effective to prolong the useful life the lapping carriers. Further, the use of materials as detailed herein provide improved rigidity, which in turn enables more precise machining operations, particularly with respect to the mounting surface of the carrier.

While embodiments have been described herein with particularity, it is understood that those skilled in the art may make modifications yet still fall within the scope of the present claims.

What is claimed is:

1. A lapping carrier for machining a row of magneto-resistive elements, comprising a plurality of movable elements, the movable elements terminating at an outer surface to form a generally planar mounting surface for a row of magneto-resistive elements, wherein the lapping carrier comprises a ceramic material, the ceramic material comprising an electrostatic discharge dissipative material having a density of a least 95% of theoretical density.

2. The lapping carrier of claim 1, wherein the density is at least 97% of theoretical density.

3. The lapping carrier of claim 1, wherein the density is at least 98% of theoretical density.

4. The lapping carrier of claim 1, wherein the density is at least 99% of theoretical density.

5. The lapping carrier of claim 1, wherein the lapping carrier is formed by hot isostatic pressing.

6. The lapping carrier of claim 5, wherein hot isostatic pressing is carried out in a non-oxidizing environment.

7. The lapping carrier of claim 6, wherein hot isostatic pressing is carried out in an environment consisting essentially of an inert gas.

8. The lapping carrier of claim 6, wherein hot isostatic pressing is carried out in an environment having an oxygen partial pressure of less than $10^{-2}$ torr oxygen.

9. The lapping carrier of claim 1, wherein each movable element is adapted to be biased and move in a direction generally perpendicular to the plane of the mounting surface.

10. The lapping carrier of claim 9, wherein each movable element is independently movable.

11. The lapping carrier of claim 1, wherein at least the movable elements comprise said ceramic material.

12. The lapping carrier of claim 1, wherein the lapping carrier is formed by a molding process to form a near net-shaped ceramic green body, and heat treating the ceramic green body to form a densified ceramic body.

13. The lapping carrier of claim 12, wherein the densified ceramic body is machined to final dimensions.

14. The lapping carrier of claim 13, wherein machining includes forming the movable elements by wire sawing.

15. The lapping carrier of claim 1, wherein at least a portion of the lapping carrier comprises a monolithic body formed of said ceramic material.

16. The lapping carrier of claim 1, wherein the lapping carrier is composed of individually fabricated subcomponents that are bonded together.

17. The lapping carrier of claim 16, wherein the subcomponents are heat treated and densified prior to bonding.

18. The lapping carrier of claim 17, wherein the movable elements are bonded to a main body portion.

19. The lapping carrier of claim 18, wherein bonding is carried out by brazing.

20. The lapping carrier of claim 19, wherein the carrier further includes a braze.

21. The lapping carrier of claim 1, wherein the ceramic has a resistivity within a range of about $10^3$ to $10^{11}$ Ohm-cm.

22. The lapping carrier of claim 21, wherein said resistivity is volume resistivity.

23. The lapping carrier of claim 21, wherein said resistivity is surface resistivity.

24. The lapping carrier of claim 21 wherein the resistivity is within a range of about $10^4$ to $10^{10}$ Ohm-cm.

25. The lapping carrier of claim 24, wherein the resistivity is within a range of about $10^5$ to $10^9$ Ohm-cm.

26. The lapping carrier of claim 1, wherein the ceramic comprises zirconia.

27. The lapping carrier of claim 26, wherein the zirconia comprises tetragonal-phase zirconia.

28. The lapping carrier of claim 27, wherein the zirconia is stabilized with a stabilizing component.

29. The lapping carrier of claim 28, wherein the stabilizing component comprises yttria.

30. The lapping carrier of claim 26, wherein the ceramic further comprises a resistivity modifier.

31. The lapping carrier of claim 30, wherein the resistivity modifier comprises about 5 to 60 vol % with respect to the zirconia.

32. The lapping carrier of claim 31, wherein the resistivity modifier is selected from the group consisting of oxides, carbides, nitrides, oxycarbides, oxynitrides, oxycarbonitrides, and combinations thereof.

33. The lapping carrier of claim 32, wherein the resistivity modifier is selected from the group consisting of $SnO_2$, $ZnO$, $LaMnO_3$, $LaCrO_3$, and $ZrC$.

34. The lapping carrier of claim 1, wherein the ceramic has a flexural strength of at least 500 MPa according to a 4-point bending test.

35. The lapping carrier of claim 34, wherein the flexural strength is at least 700 MPa.

36. The lapping carrier of claim 34, wherein the flexural strength is at least 800 MPa.

37. The lapping carrier of claim 1, wherein the ceramic has a voltage decay time of less than 500 ms.

38. The lapping carrier of claim 1, wherein the lapping carrier has a surface roughness Ra of less than about 3000 Å.

39. The lapping carrier of claim 1, wherein the planar mounting surface has a flatness of less than about 10 µm.

40. The lapping carrier of claim 1, wherein the planar mounting surface has a flatness of less than about 2 µm.

41. The lapping carrier of claim 1, wherein a gap extends between movable elements, each gap having a width of not greater than about 200 µm.

42. A method for lapping a row of magneto-resistive elements, comprising
mounting a row of a magneto-resistive elements to a lapping carrier, the lapping carrier comprising plurality of movable elements, the movable elements terminating at an outer surface to form a generally planar mounting surface for a row of magneto-resistive elements, wherein the lapping carrier comprises a ceramic material, the ceramic material comprising an electrostatic discharge dissipative material, and wherein there is at least one movable element for three magneto-resistive elements so at to provide at least a 1:3 ratio of movable elements:magneto-resisitive elements; and
machining the row to remove material from the row.

43. The method of claim 42, wherein the ratio is at least 1:2.

44. The method of claim 42, wherein the ratio is at least 1:1.

45. The method of claim 42, wherein the ratio is 1:1.

46. The method of claim 42, further comprising biasing the movable elements to adjust a position of portions of the row during the lapping process.

47. The method of claim 46, wherein biasing of the movable elements is carried out in response to a signal from at least one magneto-resistive element contained in the row.

48. The method of claim 47, wherein the signal is a resistance or magnetoresistance value from a magneto-resistive element of the row.

49. The method of claim 42, wherein the movable elements are biased by energizing at least one transducer.

50. The method of claim 49, wherein the at least one transducer comprises a piezoelectric element.

51. The method of claim 49, wherein the at least one transducer comprises a magnetic element.

52. The method of claim 42, wherein the ceramic has a resistivity within a range of about $10^3$ to $10^{11}$ Ohm-cm.

53. The method of claim 42, wherein the row is adhered directly to the lapping carrier.

54. The method of claim 53, wherein the row is adhered to the lapping carrier by a adhesive material.

55. A lapping carrier assembly, comprising:
a lapping carrier for machining a row of magneto-resistive elements, comprising a plurality of movable elements, the movable elements terminating at an outer surface to form a generally planar mounting surface for a row of magneto-resistive elements, wherein the lapping carrier comprises a ceramic material, the ceramic material comprising an electrostatic discharge dissipative material having a density of a least 95% of theoretical density;
an actuator assembly including a plurality of transducers for biasing a plurality of respective movable elements.

56. The lapping carrier assembly of claim 55, wherein the transducers comprise voice coils.

57. The lapping carrier assembly of claim 56, wherein the transducers comprise piezoelectric elements.

58. The lapping carrier assembly of claim 55, wherein the transducers comprise magnetic elements.

59. The lapping carrier assembly of claim 55, wherein the transducers are provided in a 1:1 ratio with the movable elements, such that a single unique transducer is associated with a single movable element for individual head control.

* * * * *